(12) United States Patent
Lin et al.

(10) Patent No.: US 8,190,703 B2
(45) Date of Patent: May 29, 2012

(54) EXTENSIBLE BROWSER PLATFORM FOR WEB APPLICATIONS

(75) Inventors: Shiding Lin, Beijing (CN); Lidong Zhou, Sunnyvale, CA (US); Chandramohan A. Thekkath, Palo Alto, CA (US); Dahlia Malkhi, Palo Alto, CA (US); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 12/107,769

(22) Filed: Apr. 23, 2008

(65) Prior Publication Data

US 2009/0271707 A1 Oct. 29, 2009

(51) Int. Cl.
*G06F 15/16* (2006.01)
(52) U.S. Cl. .......................... 709/217; 709/205; 709/216
(58) Field of Classification Search .......... 709/203–207, 709/212–219, 238–239
See application file for complete search history.

(56) References Cited

U.S. PATENT DOCUMENTS

| | | | | |
|---|---|---|---|---|
| 6,446,253 B1* | 9/2002 | Mellmer | | 717/100 |
| 6,594,682 B2 | 7/2003 | Peterson et al. | | |
| 6,854,016 B1 | 2/2005 | Kraenzel et al. | | |
| 7,017,016 B2* | 3/2006 | Chujo et al. | | 711/147 |
| 7,272,782 B2 | 9/2007 | Sneh | | |
| 7,401,115 B1* | 7/2008 | Arsenault | | 709/203 |
| 2003/0050966 A1* | 3/2003 | Dutta et al. | | 709/203 |
| 2003/0063770 A1* | 4/2003 | Svendsen et al. | | 382/100 |
| 2004/0070678 A1* | 4/2004 | Toyama et al. | | 348/231.3 |
| 2006/0004927 A1* | 1/2006 | Rehman et al. | | 709/250 |
| 2006/0095538 A1* | 5/2006 | Rehman et al. | | 709/217 |
| 2006/0143136 A1* | 6/2006 | Low et al. | | 705/64 |
| 2006/0200522 A1 | 9/2006 | Guest | | |
| 2006/0265371 A1* | 11/2006 | Edmond et al. | | 707/7 |
| 2007/0033569 A1 | 2/2007 | Davidson et al. | | |
| 2007/0073818 A1* | 3/2007 | Gardner et al. | | 709/206 |
| 2007/0079238 A1* | 4/2007 | Weinkauff | | 715/700 |
| 2007/0209005 A1 | 9/2007 | Shaver et al. | | |
| 2007/0276836 A1 | 11/2007 | Chatterjee et al. | | |
| 2008/0222628 A1* | 9/2008 | Batra et al. | | 717/171 |
| 2009/0094337 A1* | 4/2009 | Dias | | 709/206 |

FOREIGN PATENT DOCUMENTS

WO 02060154 A1 8/2002

OTHER PUBLICATIONS

Potonniee, et al., "Workshop on Mobile Ajax Gemalto Position Paper", Dated: Jul. 27, 2007, pp. 1-4.
IBM Software Group, "Stay Connected: A Successful Mobile Device Strategy Drives Productivity", Mobile and enterprise access solutions, White paper, Jan. 2007, pp. 1-12.
Viberg, "Client-Side Proxies", Dated: May 2000, http://cmc.dsv.su.se/select/csp/2.html.

(Continued)

*Primary Examiner* — Brendan Higa
(74) *Attorney, Agent, or Firm* — Microsoft Corporation

(57) ABSTRACT

An enhancement to a web browser offers an extension mechanism for web applications to utilize client-side resources, thereby moving more extensibility and flexibility to the client-side. The web browser may expose some control interfaces to meet various requirements from web applications. Using the extension mechanism, the web applications are able to offload the cloud servers, function when offline, and improve performance. The extension mechanism also provides users with full control to the data passing through their web browsers.

18 Claims, 7 Drawing Sheets

OTHER PUBLICATIONS

Frommer, "Your Tube, Whose Dime?", Dated: Apr. 28, 2006, http://www.forbes.com/intelligentinfrastructure/2006/04/27/video-youtube-myspace_cx_df_0428video.html.

"What is the Google Gears API?", http://code.goggle.com/apis/gears/, Apr. 22, 2008.

Wang, et al., "Protection and Communication Abstractions for Web Browsers in MashupOS", ACM SIGOPS Operating Systems Review, vol. 41, Issue 6 (Dec. 2007), SOSP '07, Year of Publication: 2007, pp. 1-15.

"MIX07: Extending the Browser Programming Model with Silverlight", http://blogs.msdn.com/dthorpe/archive/2007/05/02/mix07-extending-the-browser-programming-model-with-silverlight.aspx.

"YouOS A Web Operating System (Alpha)", http://www.youos.com/, Apr. 22, 2008.

* cited by examiner

EXTENSIBLE BROWSER PLATFORM FOR WEB APPLICATIONS

BACKGROUND

With features such as asynchrony and partial refreshing, AJAX (asynchronous JavaScript and XML) greatly enriches the interactions between users and servers, making services function more like applications. These web-based services are referred to herein as web applications. Web applications, provided by cloud services and accessed via web browsers, have been growing in popularity. Despite the success of AJAX, which enables new classes of web applications, the ability for these web applications to tap into the client-side resources and peer-to-peer resources is limited, largely due to the extensibility model of the browsers and security concerns.

Web applications have properties such as a uniform and familiar browser interface, no installation, and universal data accessibility. But there are limitations in the current web application model. The response time of user actions is often large since most of them involve requests to the remote servers. Even with partial refreshing and asynchrony, the roundtrip time cannot be hidden for newly requested content. Most applications do not implement a data access layer with caching capability, and the built-in caching functionality in the browser is not able to handle dynamic data. For instance, in mail applications, every time users click a mail item, the data needs to be reloaded from the server even when it was just read a few seconds ago. Intensive server involvement also results in high load on the backend servers.

Additionally, service availability hinges on network connection and server availability; that is, clients have to be always online and servers need to be always available. Due to the universal accessibility and wide adoption of web applications, more and more people tend to save their data on the servers offering the web services. When disconnected or service being unavailable, users will be unable to access their data.

SUMMARY

An enhancement to a web browser in the form of a platform offers an extension mechanism for web applications to utilize client-side resources, thereby moving more extensibility and flexibility to the client-side. The web browser may expose some control interfaces to meet various requirements from web applications. Using the extension mechanism, the web applications are able to offload the cloud servers, function when offline, and improve performance. The extension mechanism also provides users with full control to the data passing through their web browsers.

In an implementation, a safe extensible browser platform may support an offline mode for web applications (e.g., offline mode for web mail service) and peer-to-peer offloading of web applications.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
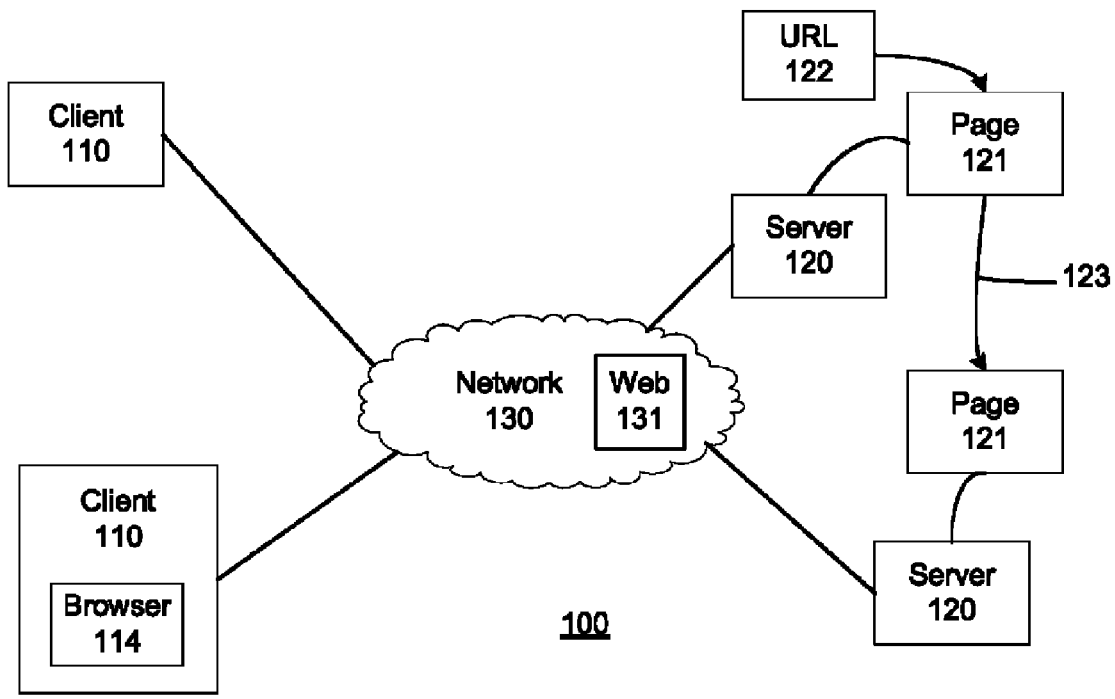
FIG. 1 shows an example of a computing environment in which aspects and embodiments may be potentially exploited.

FIG. 1 shows an example of a computing environment 100 in which aspects and embodiments may be potentially exploited. The environment 100 includes one or more client computers 110 ("clients") and one or more server computers 120 ("servers") connected to each other by a network 130, for example, the Internet, a wide area network (WAN) or local area network (LAN). The network 130 provides access to services such as the World Wide Web (the "web") 131. The web 131 allows the client computer(s) 110 to access documents containing text-based or multimedia content contained in, e.g., pages 121 (e.g., web pages or other documents) maintained and served by the server computer(s) 120. Typically, this is done with a web browser application program 114 (referred to herein as a "web browser" or "browser") executing in the client computer(s) 110. The location of each page 121 may be indicated by an associated uniform resource locator (URL) 122 that is entered into the web browser application program 114 to access the page 121. Many of the pages may include hyperlinks 123 to other pages 121. The hyperlinks may also be in the form of URLs. Content accessed by the client computer(s) 110 may also be dynamically generated, e.g., from a database maintained and served by the server computer(s) 120.

In the conventional model of web applications, only a single application is allowed in each browser instance at any time. Although in mash-up services and web-based operating systems users are able to use multiple applications, the integration is actually conducted in the server side: it remains a single application from the perspective of the browser. As described further herein, a set of capabilities for web applications may be enabled by leveraging client-side local resources and peer-to-peer resources.

An extensible web browser platform with security is provided. Web applications may dynamically load an extension (referred to herein as a "kuplet") into the platform. Control interfaces may be exposed to the kuplet, so that the kuplet may manipulate the communication between the server and the browser. The browser platform also may provide isolated local storage for the kuplet. Kuplets may be considered to be extensions of a browser.

Figure 2:
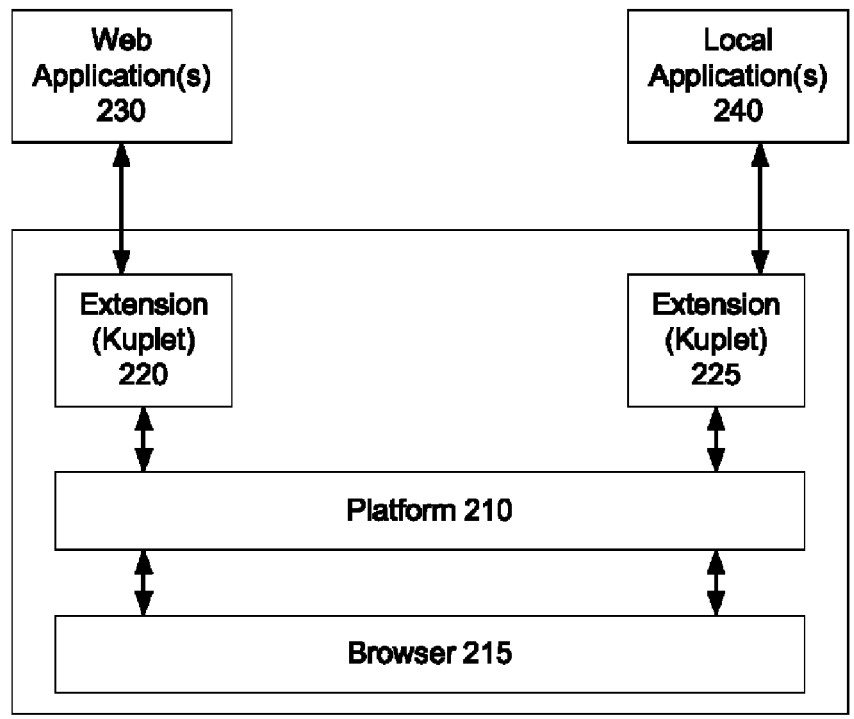
FIG. 2 is a block diagram of an implementation of a web application model.

FIG. 2 is a block diagram of an implementation of a web application model 200. A platform 210 interfaces with a browser 215. Extensions or kuplets 220 are also provided. One or more web applications 230 and/or one or more local applications 240 may install one or more of the kuplets 220, 225 to be associated with the platform 210. The kuplets 220, 225 interpose on the communication from/to the website for which they are responsible. Although only two kuplets are shown, it is contemplated that any number of kuplets may be provided. Similarly, any number of web applications and local applications may be used.

The kuplets 220, 225 provide a mechanism for the web applications 230 to interact with other web applications or local applications (if they expose HTTP or COM interfaces). The control is transferred from the browser 215 to the kuplets 220, 225 at various communication points. As described further herein, this mechanism provides for the incorporation of functionalities such as application-dependent caching and prefetching, as well as enabling offline support and peer-to-peer data transfer.

A web application 230 can implicitly state in its web page the need for a list of kuplets 220, 225. The platform 210 may automatically download and install the kuplets 220, 225 after acquiring users' permissions. Alternatively, users can explicitly download and install general-purpose kuplets that oversee all web applications 230 running on the browser 215. A kuplet explicitly manifests the targets (i.e., URLs for web applications) that it is responsible for and it may only be triggered by the communication from/to the specified targets. A kuplet may provide enough information for users to decide whether or not to authorize the installation of the kuplet. To limit the security risks imposed by kuplets 220, 225, they may be written in interpreted languages such as java-script or a sandboxing technique may be employed to isolate their executions. Refined security policies may be further specified and enforced on kuplets, similar to that which is done in Java security.

Thus, the kuplets 220, 225 are an extension mechanism to the browser 215. Control interfaces over certain critical processing points of the platform 210 are exposed. This allows a web application 230 to inspect the traffic between the browser 215 and the web server, intelligently cache dynamic data, provide an offline behavior, and/or adapt the application logic dynamically.

To use kuplets, no modification to the web applications is needed, and the kuplets can be totally transparent to a server. Additionally, the enhancement that users experience does not depend on the development of web applications. Moreover, users may be provided with the decision on determining what service and data can be passed to their browsers.

Figure 3:
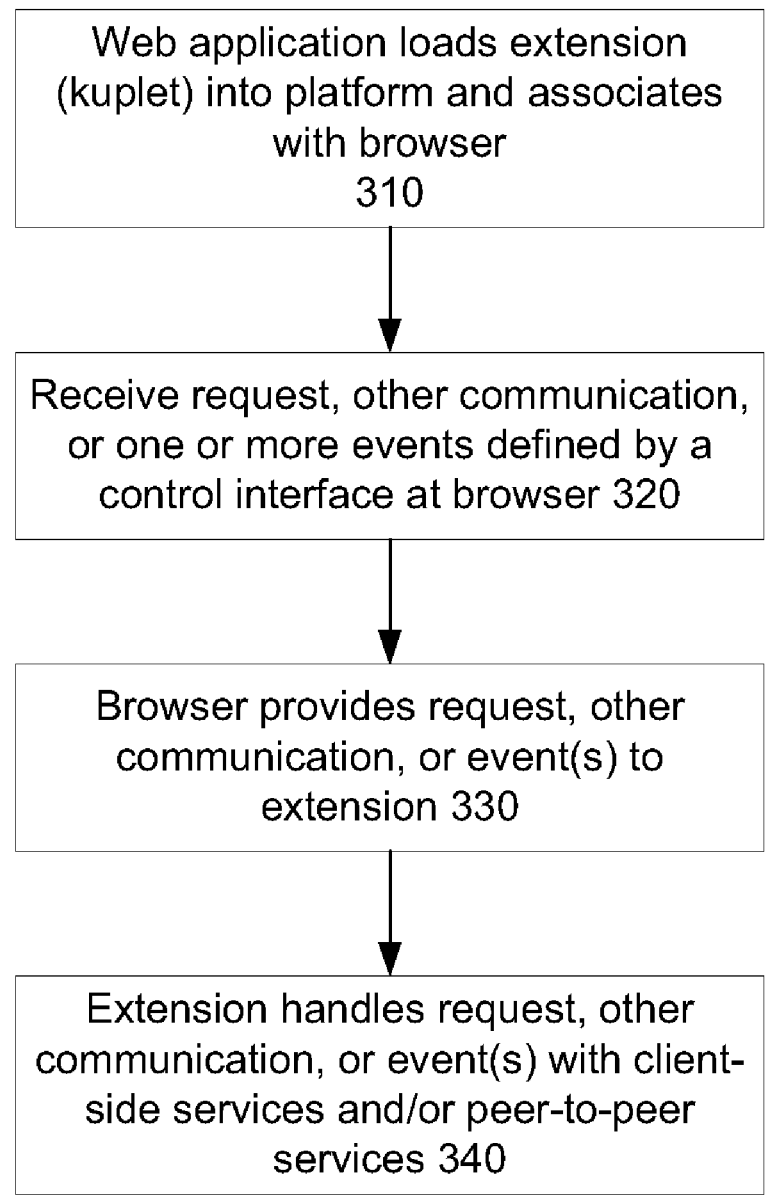
FIG. 3 is an operational flow of an implementation of a method that uses an extension.

FIG. 3 is an operational flow of an implementation of a method 300 that uses an extension. One or more control interfaces may be exposed to the extension to allow the extension to manipulate the communication between a server and the browser. At 310, a web application loads an extension or kuplet into the platform and associates the extension with a browser. At 320, a request, other communication, or one or more events defined by a control interface, may be received at the browser. The browser provides the request, other communication, or event(s) to the extension at 330, which handles the request, other communication, or event(s) with client-side services and/or peer-to-peer services at 340, as described further herein. It is noted that at 320 and 330, the platform may get control at the appropriate points in the communication (not just when the request is received), and may execute the corresponding kuplet accordingly.

Figure 4:
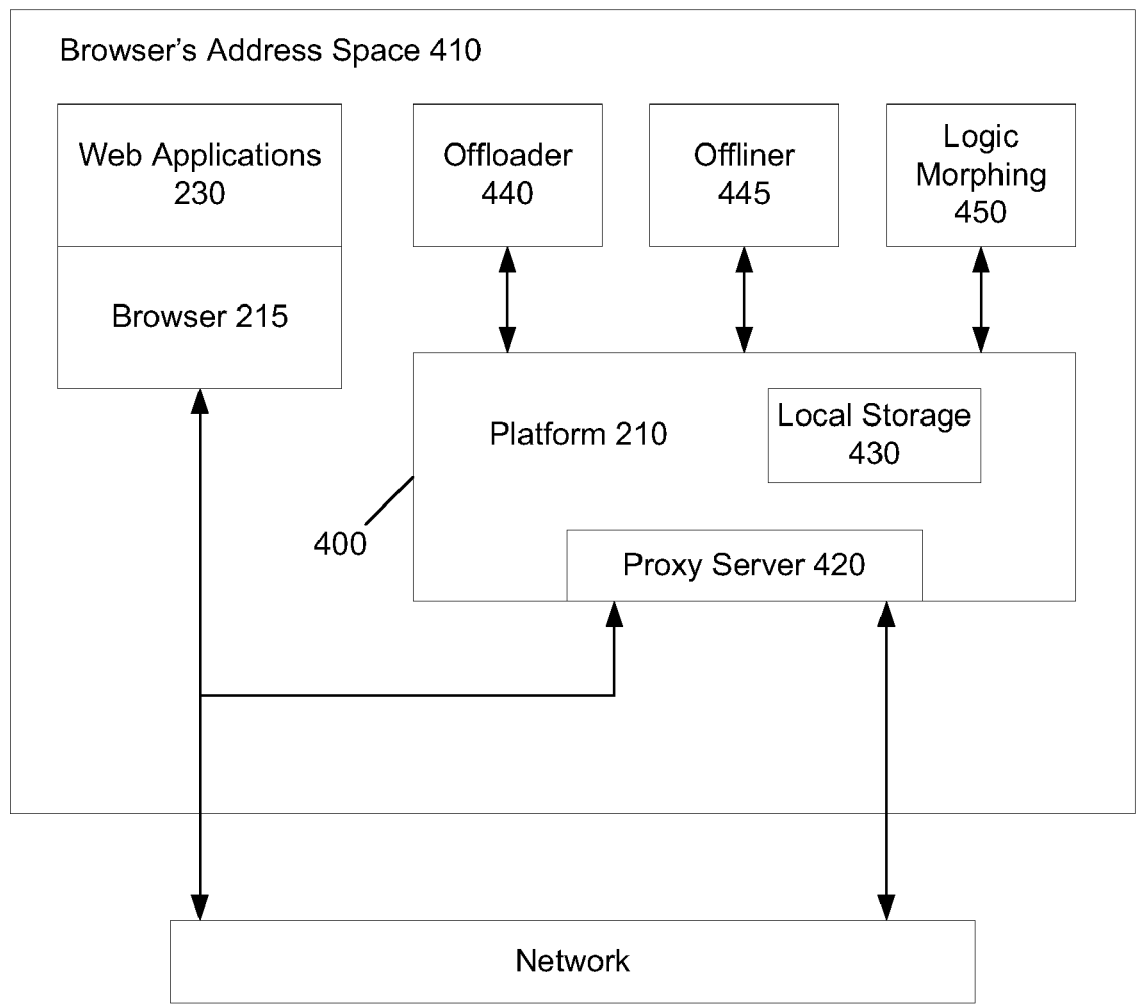
FIG. 4 is a block diagram of an implementation of a platform architecture.

FIG. 4 is a block diagram of an implementation of a platform architecture 400. The platform 210 may comprise an extensible HTTP proxy that runs inside a browser's address space 410. The platform 210 redirects HTTP requests originated from the browser 215 to an embedded proxy server 420 bound to a loopback interface. Upon receiving redirected requests or the corresponding responses, the platform 210 may trigger the corresponding kuplets. Example kuplets shown are offloader 440, offliner 445, and logic morphing 450, described further herein. The platform 210 may run on any browser, as may the kuplets.

The architecture may include a local storage 430 for kuplets to store persistent data locally. To ensure security, privacy, and manageability, the storage for each kuplet may be isolated. In an implementation, no kuplet may be allowed to access others' storage space and each of them may have an independent quota. To some extent, the local storage 430 may be similar to a cookie, but is more powerful, more flexible, and better controlled.

Regarding interfaces, web applications 230 running in a browser could benefit from interposing between the browser 215 and a web server in order to inspect the traffic and take appropriate actions. Kuplets 220, 225 may be triggered at appropriate control points for implementing certain features. Control points may include:

1. When there is going to be a request, check whether or not the kuplet is interested;
2. Before a request is issued to the server, inspect and/or modify the data or respond to this request directly;
3. Upon the receipt of a response, but before delivery to the browser, inspect and/or modify the data or send the request again; and
4. When the server fails to respond to this request (e.g., due to connection, unavailability, or error), answer the request locally.

A web application may provide two different sets of handlers. A first set may be at the application level, while the second may be at the HTTP request level. In an implementation, INITALIZER, CLEANER and SESSION_FILTER are in the first set. Each kuplet may actively register itself by calling RegisterKuplet( ). For dynamically loaded kuplets, the callbacks may be retrieved from a manifest file or in .dll exported functions, for example.

As the names imply, INITALIZER and CLEANER may be called when the kuplet is loaded and unloaded, respectively. SESSION_FILTER may be called when a request is prepared, so that the kuplet can decide whether or not to inspect this request. Enough information is provided in the parameters so that the kuplet can check against the verb and URL. If interested, the kuplet can generate an object that implements an interface (e.g., "CProxyProcV") and returns that object. Otherwise, it returns NULL.

A second set of callbacks may be encapsulated in an abstract class associated with CProxyProcV. Interfaces that may be implemented include ProcClientData( ), ProcServerData( ), and DoFallback( ). The abstract class may be used since it is a more natural container to store context for the callbacks. Two parameters, header and data, may be provided for each of them.

ProcClientData( ) may be called when there is an outgoing request to the server. By returning true, the request will be sent to the server. Both the header and data can be modified. A return value of false means that the kuplet is able to fulfill this request locally and header/data will be sent back to the client.

ProcServerData( ) may be called when a response comes from the server, but before it is delivered to the browser. Returning true will send this response back to the client. Similarly, both the header and data can be modified. If the kuplet needs to re-issue a request to the server instead of sending the response back, it can modify the header/data and return false.

DoFallback( ) may be called when the request cannot be answered due to a failure, such as network disconnection or server unavailability. This offers the kuplet a chance to send back some cached results or to handle the failure gracefully. If the kuplet cannot handle this, it may return false.

The kuplet offloader 440 may be used in conjunction with a blog service provider, where a user posts content, such as articles and photos, and her friends or other users can view the postings and comment on those, for example. The traffic to the blog servers is significant. Due to the high load on the servers, sometimes it will take users a long time to download the content, especially the photos. A folder sharing facility (e.g., in Windows Live Messenger) may be used for propagating photos from a user to her friends or other users. Thus, with offloader, a peer-to-peer cache stores the content.

Figure 5:
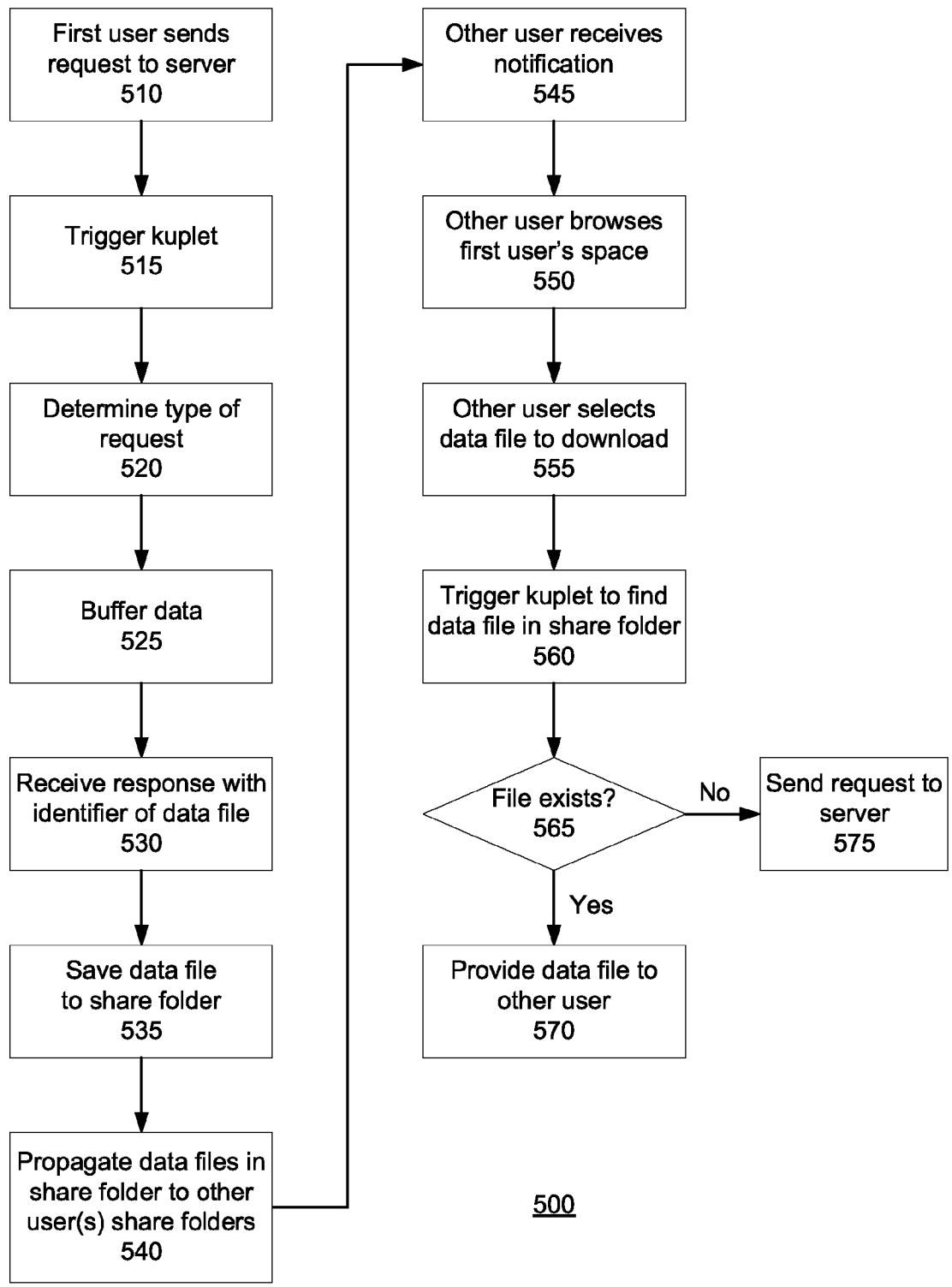
FIG. 5 is an operational flow of an implementation of a method that uses an offloader kuplet.

FIG. 5 is an operational flow of an implementation of a method 500 that uses an offloader kuplet, e.g. for a blog service provider. The offloader kuplet leverages a folder sharing facility for file transfer and provides caching and prefetching capabilities. Prefetching reduces the response time and the load on the backend servers.

At 510, a user (the "first" user) sends a request to a server. At 515, the kuplet is triggered (ProcClientData callback). From the URL, the type of request may be determined at 520; e.g., that it is a data file uploading request, such as a photo uploading request. The data may be buffered at 525. A response containing an identifier of the data file (e.g., the photo) is received at 530 (ProcServerData callback). At 535, the data file may be saved to a share folder with the identifier being its name.

At 540, the files in the share folder may be propagated to one or more other users share folders. The other users may be specified by the first user, e.g., as friends or buddies of the first user. At 545, one of the other users may receive notification about the update of content associated with the first user. At 550, the other user may browse the content associated with the first user (e.g., the first user's space).

The other user may select the data file to download at 555, and the kuplet may be triggered to find the data file in the share folder at 560. If the data file exists as determined at 565, then data file is provided to the other user at 570. Otherwise, the request is sent to server at 575.

Offline operability is another factor of a user experience on web applications. Offliner 445 may be used with email providers. By tracing the communication between the browser and mail servers, it may be determined that the mail is fetched by a POST command as part of an HTTP request. Through an analysis, the real parameters may be found to reside in the post data instead of in the query string of URL.

An offliner 445 kuplet allows for cached mails to be read when a user is offline. The user may also compose a new mail, reply, or forward a cached mail when offline. When the user is offline and sends a new mail, the pending mail will be sent to the server when the machine becomes online. The pending mails can be found in the Sent box with the status being PENDING. The user can also read this mail. Thus, when a user connects to a server, the user's messages are recorded, so that the user goes offline, a user request will get sent to a local proxy server (i.e., intercepted by the local proxy server) which will act as the server and provide messages that had been saved. This leverages the client-side.

Figure 6:
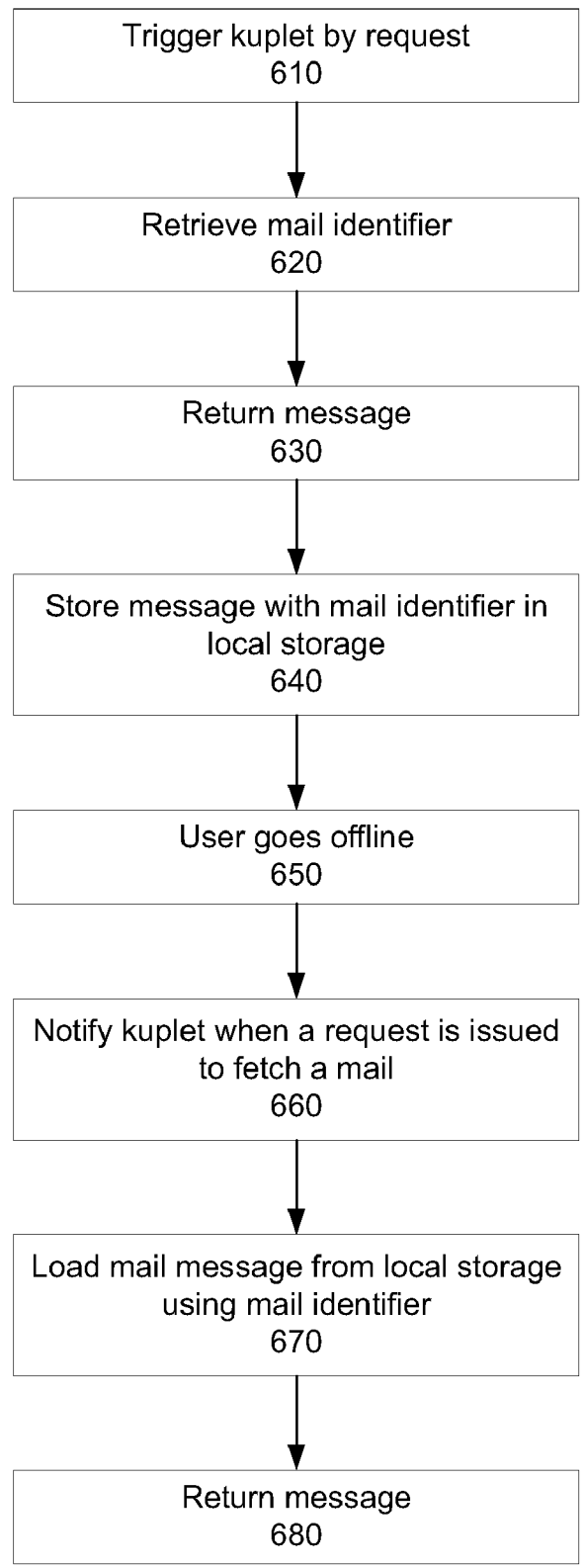
FIG. 6 is an operational flow of an implementation of a method that uses an offliner kuplet.

FIG. 6 is an operational flow of an implementation of a method 600 that uses an offliner kuplet. At 610, an offliner kuplet is triggered by a request (ProcClientData callback). The kuplet knows that this is a mail read request and at 620 retrieves the mail identifier in the post data. After the message is returned (ProcServerData callback) at 630, the kuplet saves the message data with the mail identifier in the local storage at 640.

When the user is offline at 650, because of either a disconnected network or server being unavailable for example, the kuplet is notified at 660 by DoFallback callback when a request is issued to fetch a mail. The message associated with the mail may be loaded from local storage at 670 using the mail identifier, and the message is returned to the user at 680.

Since the mail messages are immutable, the cached messages may be returned even when the user is online to reduce server load and increase responsiveness.

Peer-to-peer video sharing may be enabled by kuplets. Supporting video uploading and serving requires a large amount of storage and bandwidth. In an implementation, a service can support video sharing, with the actual video viewing among the users is done transparently through a peer-to-peer network. Thus, an entire video may not be uploaded by a user to a server, just a link to a peer-to-peer network. In this manner, the server serves as a re-direction point.

In those scenarios, the ability to leverage client-side resources and peer-to-peer resources translates into a better user experience in terms of functionality and performance, as well as reduced load on the backend servers which leads to a reduced cost of maintaining the backend servers and/or improved service performance.

Because kuplets are able to modify the downloaded web pages or java-scripts before sending to the browser, the web application's logic may be transparently changed, referred to as logic morphing. This may allow for kuplets that remove ads, change the style (CSS control), or enhance a photo-based blog with video browsing capability, for example.

Local mash-up service may also be provided. A kuplet may issue HTTP requests to other websites. The data can be directly integrated into the original application. Thus, there is no need to set up a dedicated server to proxy the traffic for the mash-up.

In general, a web application includes two sets of logic, the client-side logic and the server-side logic. The client-side logic may be expressed in java-scripts or HTML pages and is responsible for the user interface (UI) and data requests. The server-side logic provides an interface to serve data requests. Code and data separation is usually adopted in AJAX-based applications. For the traditional web applications, data are embedded in the web pages and the whole page needs to be reloaded when the data are about to change. If having located the data, a kuplet may service the traditional style as well. The client-side logic will be downloaded and is cacheable, while the data are dynamic and usually not cacheable.

Figure 7:
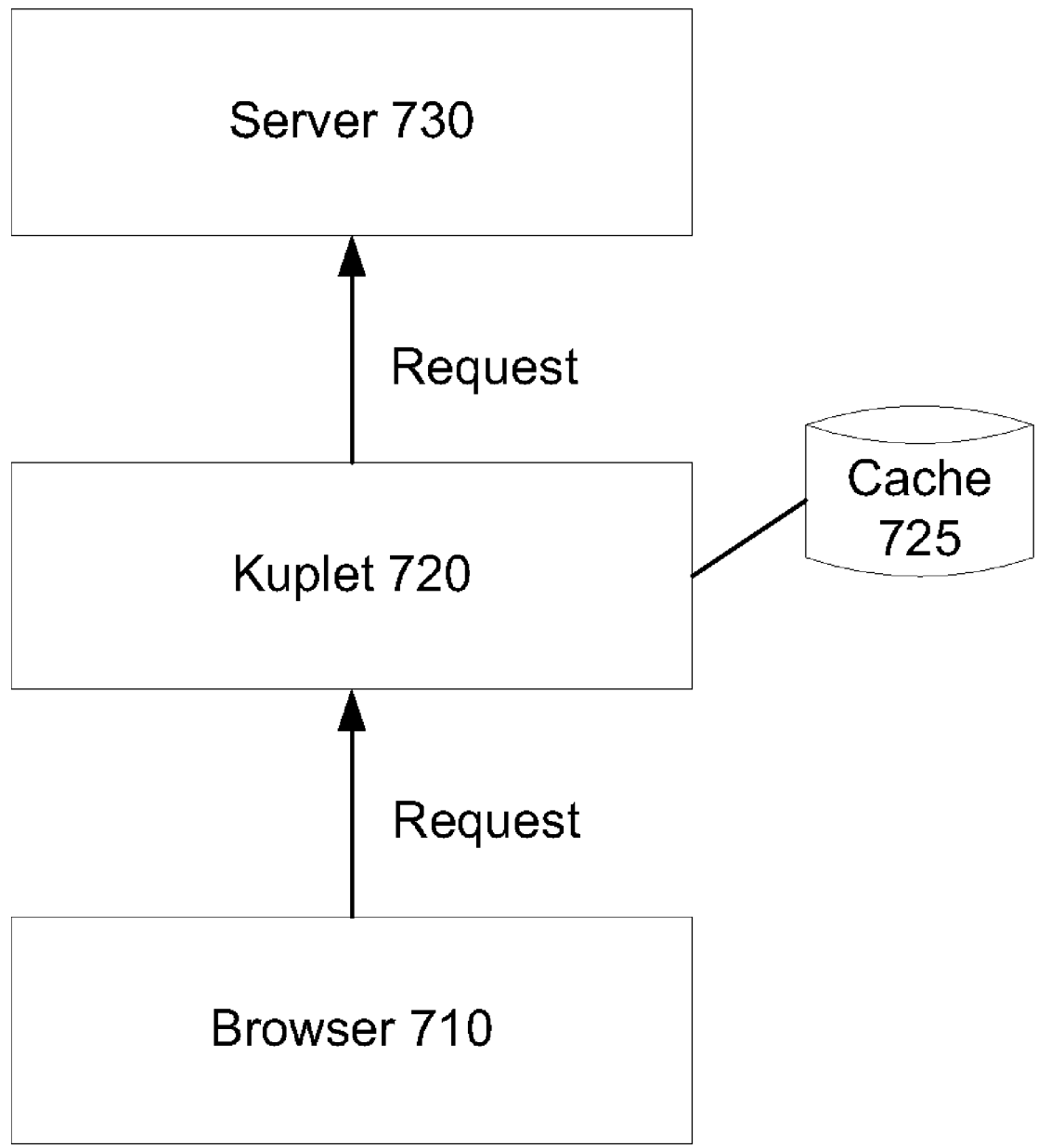
FIG. 7 is a block diagram of an implementation of a kuplet used in simulation.

An approach to offline operability is to use simulation to mimic the server interfaces. Generation of corresponding outputs for given inputs is described with respect to a simulation approach. The kuplet is an interposition layer between the server and the client, and it is able to inspect all the traffic. Therefore, if the offline operability is limited in answering the requests that have happened before, there is no need to probe the server. As shown in FIG. 7, the kuplet 720 is an interposition layer between a server 730 and a browser 710 and may inspect all traffic between them. The kuplet 720 may manage the communication between the server 730 and the browser 710. The kuplet 720 is able to cache a request and a response in a cache 725 and may answer the request based on the cached response.

Read-only operations are straightforward and can be handled by local logic or local cache. Write-related operations bring some complexity because the consistency is to be maintained between the server and client. For the simulation approach, the write requests may be buffered when offline, and the requests may be re-issued to server when online.

An issue for an extensible platform is security. Since kuplets can be dynamically downloaded from the network and are not trusted, the security model may adhere to the following principles:

Explicit authorization. A kuplet manifests the server domain names for which it is responsible explicitly. Thus users can check the domain so as to decide whether or not to authorize the kuplet. A kuplet can also be signed by a domain owner, so the certificate matches the domain it claims responsibility for. The users also have the power to disable a kuplet at any time.

Hard isolation. Storage isolation and execution isolation may be provided for kuplets. The local storage may be allocated at a kuplet basis and it may not be possible for a kuplet to access the storage of others. To help preserve privacy, the users may clear a kuplet's storage. For execution isolation, the kuplet will not get a chance to be triggered by the communication with the server that it does not own. Additionally, the kuplet's execution may be sandboxed by the language interpreter or by a type-safe language.

Limited interfaces. Kuplets may only be triggered at some processing points. It is a tradeoff between functionality and security.

It is noted that a kuplet may support multiple accounts. While the data for multiple accounts may be co-located in the same storage unit, it is the kuplet's duty to provide isolation for different accounts.

Web applications can load dynamic kuplets into the browser platform to fulfill their extensibility requirements. While the web pages render UI and server-side logics service data requests, the kuplets run as server delegates in the browser to manipulate the requests. They are able to inspect the traffic, modify the data, buffer the requests, cache the results, etc. For the web application developers, they are provided the ability to customize the client-side platform and access local resources.

Figure 8:
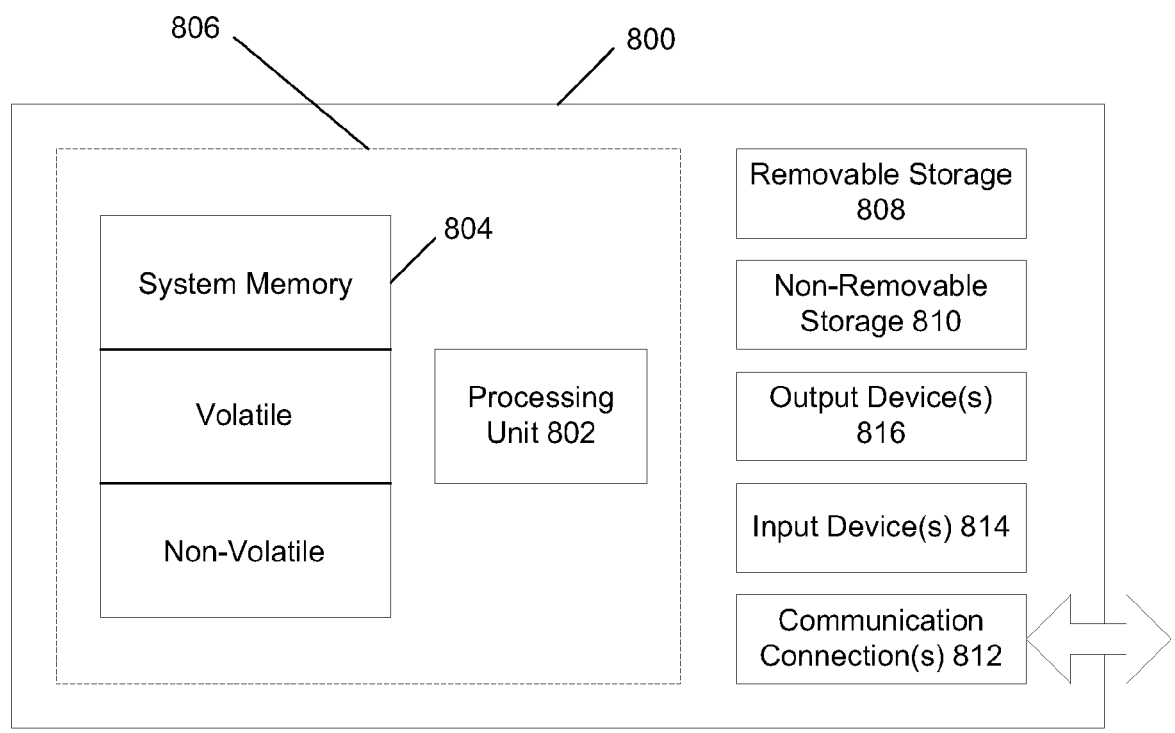
FIG. 8 shows an exemplary computing environment.

FIG. 8 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by computing device 800 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 804, removable storage 808, and non-removable storage 810 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may contain communications connection(s) 812 that allow the device to communicate with other devices. Computing device 800 may also have input device(s) 814 such as a keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be affected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
    a computing device that communicates with a server and a plurality of client computers by a network, wherein the computing device executes a browser and comprises a peer-to-peer cache;
    an extensible browser platform interfacing with the browser; and
    an extension installed by a web application into the extensible browser platform,
    wherein the extension allows integration of the web application with a plurality of client-side local resources and a plurality of peer-to-peer resources,
    wherein the extension interposes on a request to be sent from the computing device to the server to store content, and determines, based on the availability of the server, whether to issue the request to store the content to the server or to fulfill the request to store the content locally by allowing peer-to-peer offloading of the web application to receive and store the content in the peer-to-peer cache, and
    wherein pursuant to receiving a request at the computing device for the content, and wherein the request is received from one of the client computers, the extension interposes on the request and determines whether to issue the request for the content to the server or to provide the content to the client computer from the peer-to-peer cache, wherein the determination is based on whether the request can be fulfilled from the peer-to-peer cache.

2. The system of claim 1, further comprising a local application to the browser that installs the extension to be associated with the extensible browser platform.

3. The system of claim 1, further comprising a plurality of control interfaces that are exposed to the extension to allow the extension to interpose on a communication between the server and the browser.

4. The system of claim 1, wherein the extensible browser platform comprises isolated local storage for the extension.

5. The system of claim 1, wherein the extension provides a mechanism for the web application to interact with another web application or a local application.

6. The system of claim 1, wherein the extension is specific to an application, interposes on a communication between the server and the browser, exposes an event, and is triggered when the event happens.

7. The system of claim 1, wherein the extension allows the web application to function when offline.

8. The system of claim 7, wherein the web application comprises a web mail service.

9. The system of claim 1, further comprising a cache, wherein the extension is able to cache the request for the content and a response to generate a cached response, and respond to the request for the content based on the cached response.

10. An extensible browser platform for a browser executing on a computing device, comprising:
    an extension to the browser that allows integration of a web application with a plurality of client-side local resources and a plurality of peer-to-peer resources,
    wherein the extension interposes on a request to be sent from the computing device to a server to store content, determines, based on the availability of the server, whether to issue the request to store the content to the server or to fulfill the request to store the content locally, and allows peer-to-peer offloading of the web application to receive and store the content in a peer-to-peer cache of the computing device pursuant to determining to fulfill the request to store the content locally, and
    wherein pursuant to receiving a request at the computing device for the content, and wherein the request is received from a client computer, the extension interposes on the request and determines whether to issue the request for the content to the server or to provide the content to the client computer from the peer-to-peer cache, wherein the determination is based on whether the request can be fulfilled from the peer-to-peer cache; and
    a local storage for storing data from the extension locally.

11. The extensible browser platform of claim 10, wherein the extension is loaded by the web application or a local application.

12. The extensible browser platform of claim 10, wherein the extension handles the request for the content with client-side services or peer-to-peer services.

13. The extensible browser platform of claim 10, wherein the extension transparently changes the web application's logic.

14. The extensible browser platform of claim 10, wherein the local storage is allocated such that the extension has storage isolation, and wherein the extension manifests server domain names for which the extension is responsible explicitly.

15. A computer-implemented method, comprising:
    loading an extension by a web application into a browser platform interfacing with a browser executing on a computing device, the extension allowing integration of the web application with a plurality of client-side local resources and a plurality of peer-to-peer resources;
    receiving a request at a browser to store content; and
    handling the request using the extension,
    wherein the extension interposes on the request to store the content, determines, based on the availability of the server, whether to issue the request to store the content to the server or to fulfill the request to store the content locally, and allows peer-to-peer offloading of the web application to receive and store the content in a peer-to-peer cache of the computing device pursuant to determining to fulfill the request to store the content locally, and
    wherein pursuant to receiving a request at the computing device for the content, and wherein the request is received from a client computer, the extension interposes on the request and determines whether to issue the request for the content to the server or to provide the content to the client computer from the peer-to-peer cache, wherein the determination is based on whether the request can be fulfilled from the peer-to-peer cache.

16. The computer-implemented method of claim 15, further comprising associating the extension with the browser.

17. The computer-implemented method of claim 15, further comprising exposing at least one control interface to the extension to allow the extension to interpose on a communication between the server and the browser.

18. The computer-implemented method of claim 15, further comprising the browser providing the request for the content to the extension.

* * * * *